United States Patent [19]

Breen

[11] 4,130,737
[45] Dec. 19, 1978

[54] TWO-LINK INTERCOM SYSTEM
[75] Inventor: Barry C. Breen, Woodinville, Wash.
[73] Assignee: Melco, Bellevue, Wash.
[21] Appl. No.: 837,410
[22] Filed: Sep. 28, 1977
[51] Int. Cl.² .................................................. H04M 9/06
[52] U.S. Cl. ................................................... 179/18 AD
[58] Field of Search .................................... 179/18 AD

[56] References Cited
U.S. PATENT DOCUMENTS

| 2,883,457 | 4/1959 | Carter et al. | 179/18 AD UX |
|---|---|---|---|
| 3,342,944 | 9/1967 | Barbato et al. | 179/18 AD |
| 4,010,332 | 3/1977 | Matheny | 179/18 AD X |

Primary Examiner—William C. Cooper

[57] ABSTRACT

A two-path intercom system wherein a first link or path is non-exclusive and the second link or path is exclusive. When the system is idle, the first call is automatically switched to the second link or path when the called party answers. While the first conversation is taking place on an exclusive basis, a subsequent call will be switched to the first link or path, on a non-exclusive basis. The subsequent call is automatically switched to the exclusive second link or path when said second link or path becomes idle. The system includes a conference feature whereby tone dialing phones may switch up to three stations to the second link for a private conference. An intercom code not assigned to a station is used to set up the conference. A conference on the first link may be established when the second link is busy; when the second link becomes idle, the conference is automatically switched to the second link. In the idle state all stations are connected internally to the first link or path. The first station to go off hook is switched over to the second link or path and is connected to a selector unit. When that station places a call, the called party is also switched to the second link or path upon answering. Until both parties go on hook, every other station and the selector unit are connected to the first link or path, which then acts as a single-link intercom system.

23 Claims, 10 Drawing Figures

INTERCOM TRANSFER CONTROL 7, T-FUNCTION

INTERCOM TRANSFER CONTROL 7, TRANSFER RELAY

TWO-LINK INTERCOM SYSTEM

FIELD OF THE INVENTION

This invention relates to telephone intercom systems, and more particularly to a telephone intercom system of the dial-selective two-link type, wherein one link constitutes a private talk-path and the other link constitutes a non-exclusive talk-path.

BACKGROUND OF THE INVENTION

The basic conventional telephone intercom system normally comprises a single link which is accessible by any station at all times and wherein it is not possible to exclude a third party after a conversation has been established between a calling first party and a called second party. Also, in such a conventional system it is usually difficult to exclude an additional station from the link after a conference call has been initially established between three or more stations in the one-link system.

A primary drawback to the common talk-path system of the prior art is that it is limited to handle a single intercom conversation or conference at any one time. Multiple talk-path systems which now exist have the disadvantage that they either require multiple dial-selective intercom units (and use more than one button on the associated key telephone) or else require a separate talk battery for each station phone (similar in function to the A-relay of a central office), as in the Western Electric 6A system. It would be highly desirable to provide a second talking path in a simpler manner.

Thus, there is a need for a suitable means for converting a one-link non-exclusive intercom system into a two-link system wherein a private link is included, with means for excluding additional calls from the private link, as above described, and for automatically transferring a conversation or conference into said private link when it becomes available.

SUMMARY OF THE INVENTION

Accordingly, a main object of the present invention is to overcome the above-mentioned deficiencies of the conventional one-link telephone intercom systems.

A further object of the present invention is to provide a novel and improved multi-station two talk-path adapter for conversion of single-link dial-selective key system intercoms to two-link operation, which can be readily mounted in a standard key system equipment mounting apparatus, relay rack, or on a wall, and which incorporates the following functional features:

a. Access to both links of the intercom is obtainable by the actuation of a single intercom button; lamp supervision is the same as with a single link intercom; when the lamp of a station is out the intercom is available for use; when the lamp is lit, both links are busy or one link is busy signalling.

b. Dial tone is provided as an indication that the system has been properly accessed. If the called station is already talking on one link, interrupted dial tone is forwarded to the calling party as a "busy" indication. The busy indication is also received if the conference code is dialed when one link is busy.

c. The adapter is compatible with a wide range of dial-selective intercom units featuring tone, rotary, or combination dialing, with from 10 to 37 station signalling capability.

d. The first call on an idle system is automatically switched to the second (private) link when the called party answers. All station lamps then go out, indicating that the first (non-private) link is available for a second call.

e. Whenever both links are busy in conversation, the call on the first link is automatically transferred to the second link when it becomes idle. All station lamps then go out, indicating that the first link is available for another call.

f. By using the conference feature, tone dialing phones may switch up to three stations to the second link for a private conference. Any intercom code not assigned to a station may be assigned to access the conference feature.

g. With tone dialing, the repeated signalling capability possessed by conventional intercoms may be used to establish a conference on the first link when the second link is busy. When the second link becomes idle, the conference will be automatically switched to the second link (first link conversations are not private).

h. Cross connections from the adapter to the intercom and stations can be made through standard multi-pair connector cables and to the key system power supply through screw terminals.

i. Non-key, single line phones may be used with the adapter if they are designed to give an A-lead ground indication when off hook. An extra hookswitch contact or an A-lead generator can be used for this purpose, such as the Model S-64 or M-62 unit, made by Melco, Bellevue, Wash.

j. The apparatus may be adapted for continuous, interrupted ringing and flashing lamps to the called party by using a conventional flashing lamp unit, such as Model M-266 Flashing Lamp Unit, made by Melco, Bellevue, Wash.

k. The adapter is provided with a busy indication feature which can be expanded to give the calling party a busy tone whenever the called party is busy on an outside line. This can be done by employing a conventional busy indicator, such as the Model M-268, made by Melco, Bellevue, Wash.

l. The adapter may be readily employed in connection with conventional paging systems.

A still further object of the invention is to provide an improved multi-station intercom adapter which includes a dial tone source and provides two independent talk-paths for replacing the bussed tips and rings (single link) in a dial-selective key intercom system of up to 36 tone or rotary dial key sets, wherein each of the 36 stations has access to both of the talk paths on a single intercom key, and wherein each station position can access the intercom selector via either of the two talk paths, allowing a single conventional intercom selector unit to service calls over either talk path.

A still further object of the invention is to provide an improved multi-station two-link intercom adapter for use with an intercom system having a selector unit, wherein station ringing, ringback tone, and control of the station lamps will remain functions of the intercom selector only, wherein there is no necessity for replacing station hook switches, and wherein station lamps will remain lit as long as the intercom selector is seized through either of the adapter's talk paths.

A still further object of the invention is to provide an improved multi-station two-link intercom adapter which includes all of the interface circuitry, logic elements, tone oscillators, and a relay network required to convert up to 36-station intercoms to two-path operation and which operates on the same battery supplies as other key equipment and audible supplies ranging from 10 to 110 Vac at 20 to 60 Hz, wherein the adapter unit draws relatively small current, for example, less than 250 ma, and wherein when both links are busy with conference calls the current drain will not be excessive, for example, will not exceed 750 ma, and which will be mainly furnished by battery feed to the station key sets.

BRIEF DESCRIPTION OF THE DRAWINGS

Further objects and advantages of the invention will become apparent from the following description and claims, and from the accompanying drawings, wherein:

DESCRIPTION OF A PREFERRED EMBODIMENT

Figure 1:
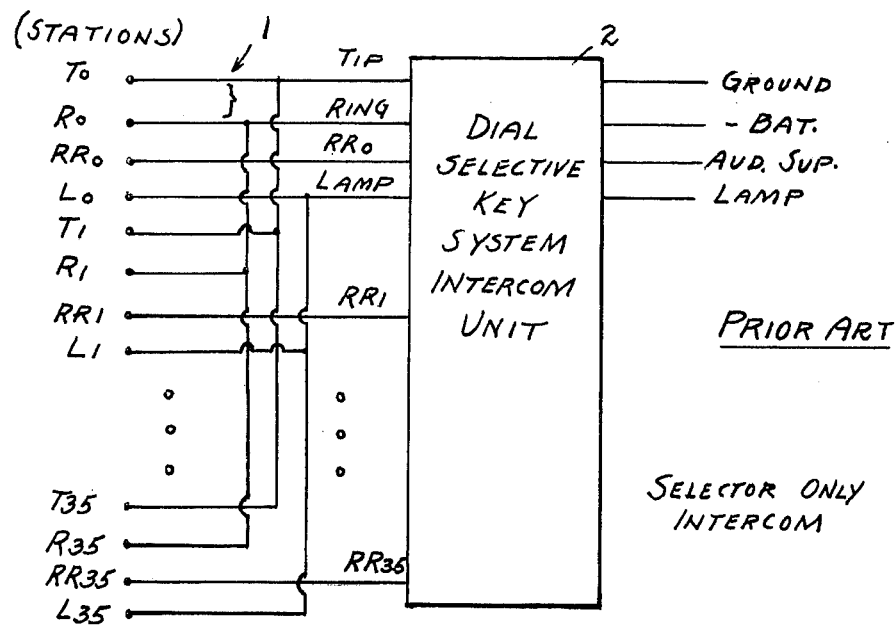
FIG. 1 is a block diagram illustrating a prior art, common talk path, dial-selective key system intercom unit.

The herein-disclosed adapter generally consists of two bussed tip-ring paths similar to the single bussed path which it replaces. In the idle state, one of the talk paths (Link 2) is supplied battery feed from the intercom selector unit while the other path (Link 1) is powered from an internal battery feed. In the idle state all stations are connected internally to Link 1. The first station to go off hook is switched over to Link 2 and thereby is isolated from the other stations and connected to the selector unit. When that station places a call, the called party is also switched to Link 2 upon answering. At this time the adapter switches the intercom selector's tip and ring over to Link 1 and the battery feed is switched to Link 2 (for talk battery). The adapter network now remains in this state until both of the parties on Link 2 go on hook. Until that occurs, every other station and the intercom selector are connected to Link 1, which then acts exactly like a single-link intercom. For this reason, Link 1 may be referred to as the "non-private link" and Link 2 may be referred to as the "private link" or "exclusive link".

The adapter determines the status of each station by monitoring the station's A-lead and its signalling output (ringer) from the intercom selector unit. The adaptor A-lead and ringer inputs for each station consist of interface circuitry which produces internal logic signals to indicate whether a station is offhook or onhook and to indicate which station is being signalled by the selector. In addition, the interface circuits protect the internal logic circuits from the high voltages and noise on the external station wiring.

As was previously mentioned, the first station to go offhook on an idle system is switched over to Link 2 (private link) along with the intercom selector. It is the sensing of a ground on that stations A-lead which causes the network to recognize this first calling party. The control circuitry then ignores all remaining A-leads and monitors the selector ringing outputs. Once a station has been signalled, it is marked by the adapter as the "called" party and only its A-lead will be recognized for transfer to the private link (Link 2). Any other station going offhook remains on Link 1 and does not have access to the selector until the called party answers on Link 2. Once two parties have been connected on the private link, ony their station status is monitored. Both of these station's A-leads must drop (go open circuit or to battery) before the private link is free for another call.

In a typical embodiment, the adapter has a dial tone source wherein the dial tone is produced by two sine wave oscillators operating at 438 Hz and 346 Hz. To the average user, this dial tone sounds identical to central office precise dial tone (440 Hz and 350 Hz). The two frequencies are mixed and coupled onto the tip of the intercom selector (TCOM), and therefore gives a positive indication of selector seizure on either link. Dial tone is enabled whenever the selector is not seized and then turned on the line when an initial offhook occurs. Dial tone is discontinued upon receipt of the first break pulse or tone dialed digit.

Station busy indication is formed by interrupting dial tone at approximately 120 interruptions per minute (ipm). This value may actually vary from 60 to 180 ipm, depending upon the circuit tolerance in a particular unit. Busy tone is turned on when a station being called is already offhook on Link 2.

As was previously mentioned in the above discussion of the adapter network, whenever only one conversation is taking place on the system, it will be on Link 2. Any new calling party must come offhook on Line 1; hence, the only station busy situation which can occur is with the calling party on Link 1 and the called party on Link 2. Because of this method of identifying busy stations, a station which signals its own code will receive a busy if calling on Link 2, but will ring itself if calling on Link 1. The busy indication is also used to indicate the non-availability of the private link when the conference code is dialed.

The busy feature can be expanded to function when a called station is offhook on an outside line, by using a conventional "Busy Indicator", such as the above-mentioned Melco Model M-268, which contains its own interrupted dial tone source identical to that of the adapter. When such a unit is included the busy indication is triggered whenever a called station is offhook with any key of the telephone set depressed (and where the adapter is not itself already providing a busy indication).

The station lamp leads are controlled by the lamp relay in the selector (which may be similar to Model KC-37, made by Melco, Bellevue, Wash.). On an idle system, the selector is not seized and all station lamps are off. When the first station offhook seizes the selector via Link 2, the selector lamp relay closes and supplies power to all the station lamps. When the called party answers and is switched to Link 2, the selector is transferred to Link 1. If there are no other stations offhook, the selector is released and the station lamps all go out. If a second calling party now comes offhook on Link 1 and places an intercom call, the selector will remain seized and serve as talk battery for the Link 1 conversation. As a result, all the station lamps remain on (indicating system busy) until one of the conversations terminates and Link 1 is free.

The station lamp operation may be modified to provide flashing lamp power to the called station by using a device such as the Melco Model M-266 "Flashing Lamp Unit." Each M-266 will convert ten stations to receive continuous, uninterrupted ringing and flashing lamps when signalled. Power to the M-266 unit may be supplied by a suitable source, such as a Model 232 KTU interrupter unit made by Western Electric.

Station ringing is controlled by the intercom selector unit only and is sensed by the adapter for called party identification. The selector unit may be similar to Model KR-10, KT-10X or KC-37, made by Melco, Bellevue, Wash., each of which provides single burst ringing of about one second duration but which can be adapted for continuous ringing.

The selector unit, of a type above identified, provides a relay contact path from an audible supply input (AUD SUP) to the ringing lead associated with the station whose code is dialed. In selected only (single talk path) installations, AUD SUP is wired directly to the bell or buzzer power supply, and any station dialed always rings. In the two path system, however, it is necessary to shut off this ringing if a busy station is called. This is done by having the adapter break the audible supply to the selector whenever the busy indication is turned on. The selector's AUD SUP input is therefore driven by the adapter's AUD 2 output, rather than the direct audible supply. AUD 2 is internally connected to the AUD 1 input through a normally closed relay contact which opens when the adapter detects busy. AUD 1 is thus connected directly to the audible power supply.

When a device such as a Melco M-268 "Busy Indicator" is included in the adapter system, the audible supply is also routed through it before being fed to the selector. In a manner similar to the adapter's AUD 1 and AUD 2 operation, the Melco M-268 device will prevent the system from ringing stations which are busy on outside lines by cutting off the audible supply.

The adapter's conference feature allows a Touch Tone station to switch any number of other stations over to the private link for conference. The number of phones which may be conferenced is dependent only upon the loop limits and talk battery level in a particular installation. With all phones in a conference offhook on the selector's battery feed, the controlling station must still be able to signal a Touch Tone digit at a level high enough to be received by the selector and properly decoded. Usually, the limit is reached when three or four stations are offhook in addition to the calling party.

In order to use the conference feature, the controlling station must be able to signal a number of different codes without going offhook in between each code; and, it must be able to dial with other stations offhook on the same battery loop. For these reasons, the calling station must be Touch Tone; and the intercom selector mated with the adapter must allow signalling of the same or different codes, without going onhook in between.

Figure 2:
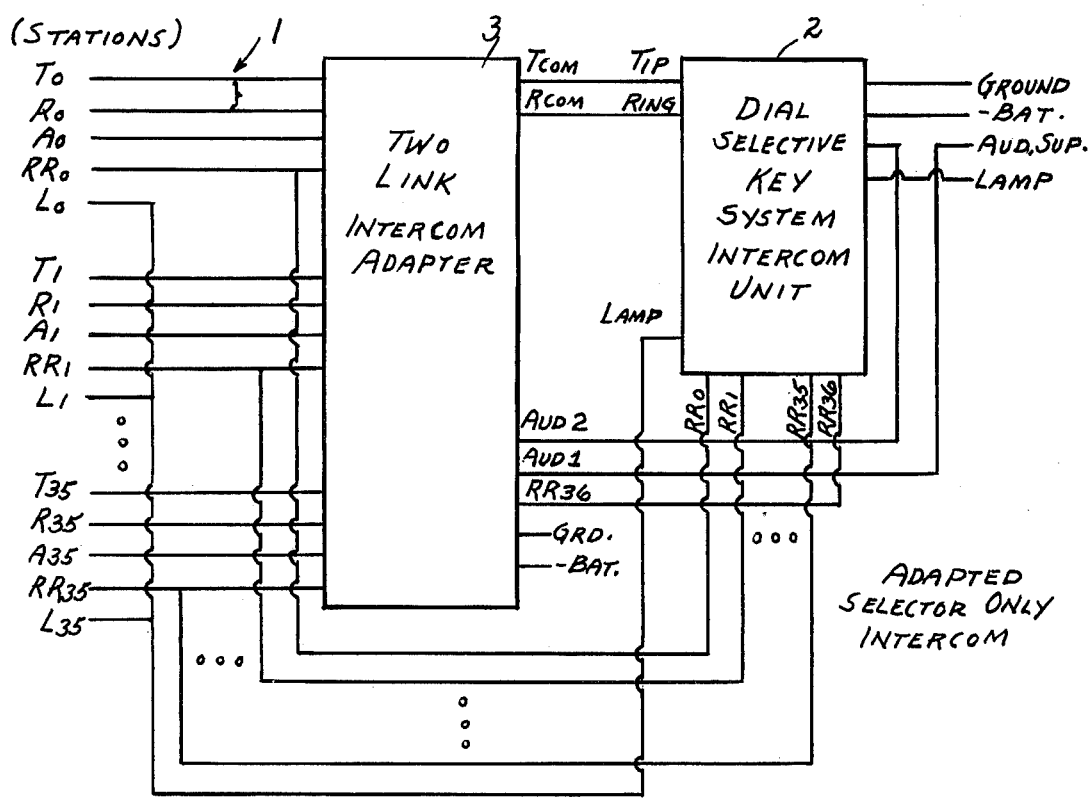
FIG. 2 is a block diagram illustrating the application of a two-link adapter according to the present invention to the intercom unit of FIG. 1.
Figure 3:
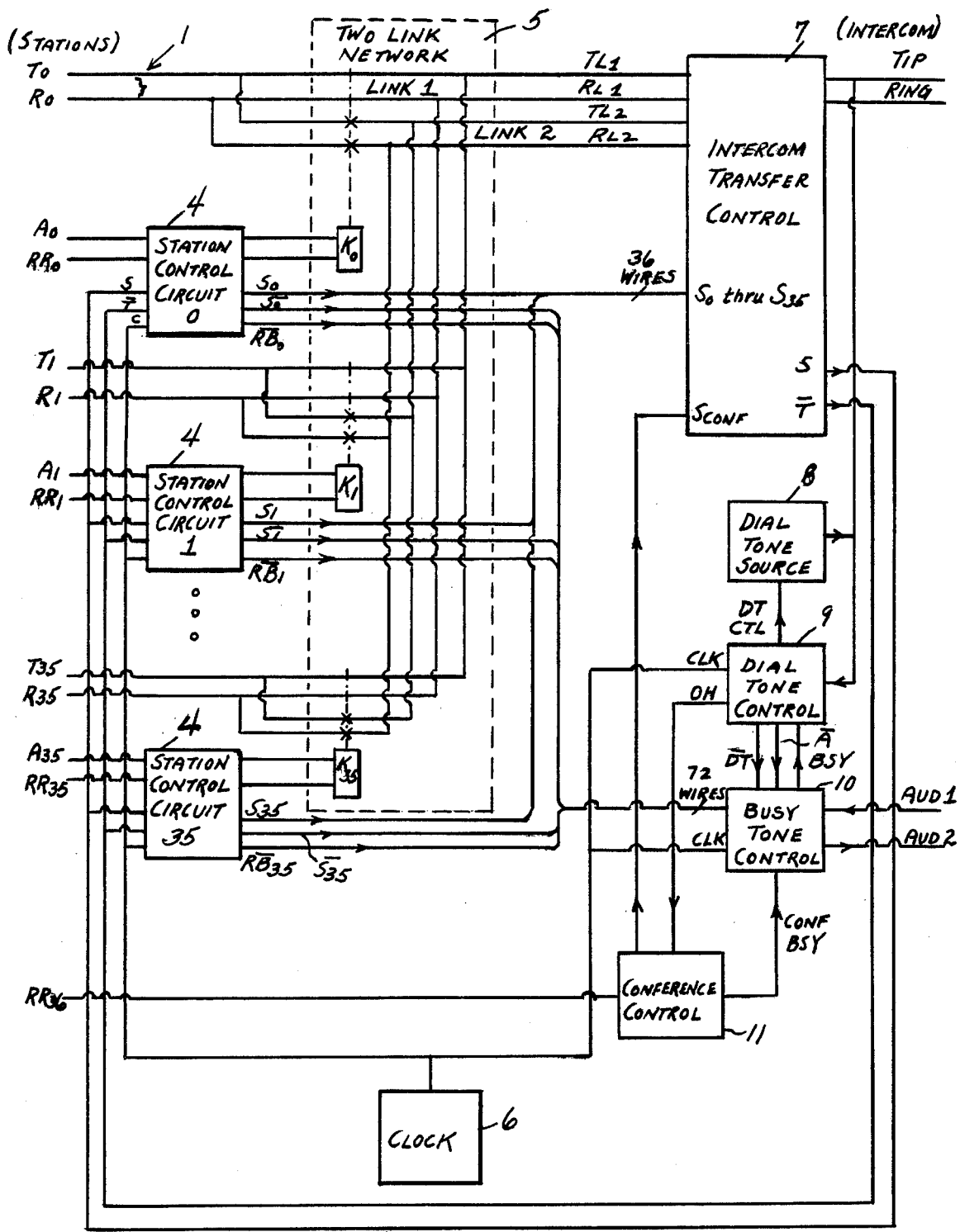
FIG. 3 is a detailed block diagram representation of the two-link adapter employed in FIG. 2.

The control code for the conference feature is selected by wiring the selector output corresponding to the desired code (R1 for digit 1, for example) to the CONF input on the adapter (shown at RR36 in FIGS. 2 and 3). When mated with a 37-station selector, the 36-station adapter will always have one code available from the selector for this purpose.

On an idle system, when the adapter senses ringing voltage (10 to 105 Vac or -DC) at the CONF (RR36) input, with the calling party on Link 2, the intercom selector is caused to transfer to Link 1, and Link 2 is locked up in reserve. The calling party will observe that dial tone breaks with an audible "click" and all the station lamps go out. The controlling station than goes onhook and off, seizing Link 1 with the selector and gets dial tone a second time. He now tone dials each of the other conference stations individually (without going onhook in between). All parties, as they answer, are connected on Link 1.

Normally, each station receives a single burst of ringing as its code is dialed and any station that does not answer can be resignalled if necessary. In systems which have been adapted for continuous ringing, as above described, however, each station whose code is dialed, in setting up a conference, will ring continually until the station answers or the conference is switched private.

Once each of the stations to be conferenced is offhook, the controlling station (or any other tone dialing station in the conference) now signals the conference code a second time. This is again sensed at the adapter CONF (RR36) input and all of the stations are switched over to Link 2, the private link. The selector is left connected to Link 1 and all the station lamps go out, indicating the availability of Link 1 for additional calls. In a system adapted for continuous ringing, any conference stations which did not answer will cease to ring and will be omitted from the conference when the transfer to privacy is made.

In the event that the conference code is not dialed a second time to release the private link, the parties in conference will remain connected to Link 1 and any other stations going offhook will join the conference. The system will remain in this state, with the private link locked out, until all stations on Link 1 go onhook, which resets the conference control and returns the system to normal, idle state.

As long as Link 2 is busy, either with a private conference or two party conversation, any station dialing the conference code on the other link will receive a busy indication from the adapter. A conference may still be established on Link 1, however, by simply going on and offhook to cancel the busy tone and then dialing each party in the conference without having to use the conference control code. When the conversation on Link 2 terminates, all stations offhook on Link 1 will be switched over to Link 2 automatically, the station lamps will extinguish, and the conference will then become private. Should Link 2 become idle before all of the conferencing stations are offhook, however, only those already offhook will be transferred. If this occurs, the conference must be reestablished, using the control code, as described above.

The adapter system herein described provides service on a "first-come, first-served" basis, with preference for the private link. If two stations try to seize an idle system simultaneously, one will receive dial tone (and have access to the selector via the private link) and the other station will have battery only (on Link 1). If the Link 1 station remains offhook, he will eventually receive dial tone (and selector access) automatically when the calling party on Link 2 completes or abandons his call. If the call on Link 2 is connected, the selector is transferred to Link 1 (dial tone commences) as the called party on Link 2 answers. If the call on Link 2 is abandoned, the station on Link 1 is instead transferred to the private link and dial tone is turned on.

In simultaneous seizures, therefore, one of the stations will normally experience a delay in dial tone similar to that of a central office during peak traffic. Should both offhooks be timed so close (within 1/1000 second) that the priority circuitry is defeated, neither station would receive dial tone without going offhook first.

The preference for the private link is also implemented whenever one conversation terminates on a completely busy system. If the remaining conversation is on the private link (Link 2), no transfer occurs and the selector attached to Link 1 becomes idle (lamps off). If the remaining conversation is on Link 1, however, the two offhook stations will be transferred to Link 2. A slight "click" will be heard by the stations as they are transferred and the station lamps go out. This transfer will always occur the moment the last station on the private link goes onhook and two or more stations are offhook on the other link. Incompleted conference calls on Link 1 are therefore cut off from the selector and must be abandoned and reestablished using the private conference control code.

In the event that Link 2 becomes idle when there is only one station offhook on Link 1, both the station and the selector are transferred to the private link. If the station has not yet broken dial tone, the caller will observe a slight break in dial tone and a flicker in the lamp as the transfer occurs. If, however, the station on Link 1 has already dialed but the called station has not answered, dial tone will be restored on transfer and the call must be redialed on Link 2. The system control circuitry maintains station status for the private link only and cannot identify called stations on Link 1. "In progress" calls which are transferred to the private link must therefore always be started over after the transfer.

Referring to the drawings, FIG. 1 illustrates the prior art, common talk path, Dial Selective Key System Intercom Unit 2, hereinafter referred to simply as intercom unit 2. Station tips and rings, shown at 1, are buss-connected together to one tip/ring input. Station signalling (rotary or tone dialing) is monitored and decoded and an audible power supply (AUD SUP) is internally switched to the called station ringer. The LAMP output is switched to LAMP power supply input to illuminate station lamps as a busy indication whenever one or more of the stations is offhook. Intercom unit 2 is similar to Melco Model KT, KR and KC units and Western Electric Model 207 or 407 KTU units.

FIG. 2 illustrates the application according to the present invention of a Two Link Intercom Adapter 3. The primary drawback of the intercom unit 2, as in FIG. 1, is that it is limited to handling a single intercom conversation at any one time. Multiple talk path systems which now exist have the disadvantage that they either require multiple intercom units 2 (and use more than one button on the key telephone) or else require a separate talk battery for each station phone (similar in function to the A-relay of a central office), as in the Western Electric 6A system. The advantage of the present invention is that is provides a second talking path in a simpler manner by essentially replacing the bussed tip/ring 1 connection with two bussed connections, a single battery feed to power the second connection, and control logic to exchange stations and intercom unit 2 between the two connections as calls are placed. It has as inputs the separate tip/ring 1, A-lead and ringer signals for each station (designated $T_n$, $R_n$, $A_n$, $RR_n$, for the nth station). The A-lead is a normally open switch contact (usually derived from the hookswitch) in the key telephone set which closes a connection to ground when a station is offhook on the intercom line button circuit. The ringer connection is the switched audible supply output from the intercom unit 2 which drives the station bell or buzzer. The Two Link Intercom Adapter 3 outputs consist of the tip and ring connections to the intercom unit 2 and a switched audible supply (AUD 2) to power the intercom unit 2 ringer selection switch input (AUD SUP). This output (AUD 2) provides a means by which the intercom unit 2 ringer outputs may be shut off when a station on one talk path attempts to call stations already busy on the other talk path. FIG. 2 illustrates a 37-station intercom unit 2 adapted by a 36-station Two Link Intercom Adapter 3, with a 37th ringer input used as a conference control (RR36). The nature and purpose of the conference control will be later described. It will be recognized that the Two Link Intercom Adapter 3 could consist of any number of station inputs, with or without a conference control, and that the thirty-six station with conference control realization described herein represents only one actual typical embodiment of the present invention.

FIG. 3 is a block diagram representation of an adapter according to the present invention consisting of 36 sets of station connections 1, Station Control Circuits 4, Two Link Network 5, Clock 6, Intercom Transfer Control 7, Dial Tone Source 8, Dial Tone Control 9, Busy Tone Control 10, and Conferences Control 11. A power supply which converts the available power (A.C. or Key System Battery, −24 VDC unfiltered) to two voltages, $-V_1$ and $-V_2$, used by the logic and other circuitry, is assumed to exist but is not included in the drawings. The only requirement of the power supply that is necessary to the invention is that the value of $V_2$ be twice that of $V_1$, the reason for which will be later disclosed in discussing the Intercom Transfer Control 7.

The Clock 6 is simply a square or pulsed wave source used to synchronize logic state changes within the adapter system. The Dial Tone System 8 is any tone source, accepted by the telephone industry as a suitable indication of proper connection to the system, having a logic level control input to turn it on and off. This control input is connected to and controlled by the Dial Tone Control 9.

Each station's tip/ring 1 is connected to the Two Link Network 5, which consists of thirty six "two-form-C" relays ($K_0$ through $K_{35}$) with normally open and normally closed contacts wired in parallel. Those familiar with relay technology will recognize that "two-form-C" relay contacts are arranged as a double-pole, double-throw (DPDT) switch. The bussed normally closed contacts form Link 1, the tip and ring of which are designated $TL_1$, $RL_1$; the normally open contacts form Link 2, the tip and ring of which are designated $TL_2$, $RL_2$. The two links additionally connect to the Intercom Transfer Control 7. Each station is thus normally connected to Link 1; activating a particular station's relay $K_n$ switches it to Link 2.

Each station's A-lead and ringer ($A_n$, $RR_n$) connect to a Station Control Circuit 4, the purpose of which is to control each station relay $K_n$. Additional inputs common to every Station Control Circuit 4 consist of the clock signal and S and $\overline{T}$, two outputs of the Intercom Transfer Control 7. Each Station Control Circuit 4 has an output $S_n$ connected to the Intercom Transfer Control 7 and two outputs, $\overline{S}$ and $\overline{RB}_n$, connected to the Busy Tone Control 10.

An extra ringing signal from the intercom unit 2, which is not assigned to a station, is connected to the Conference Control 11. The other input to the Conference Control 11, designated OH, comes from the Dial Tone Control 9. One output, $S_{CONF}$, of the Conference Control 11 is connected to the Intercom Transfer Control 7; the other output, CONF BSY, connects to the Busy Tone Control 10.

The Dial Tone Control 9 has as inputs the tip of the intercom unit 2, BSY from the Busy Tone Control 10, and a clock signal for synchronization. It outputs the gating control signal (DT CTL) to the Dial Tone Source 8, which, when activated, couples dial tone onto the tip of the intercom unit 2. Two other outputs, $\overline{DT}$ and $\overline{A}$, connect to the Busy Tone Control 10, and one other output, OH, connects to the Conference Control 11.

Figure 4:
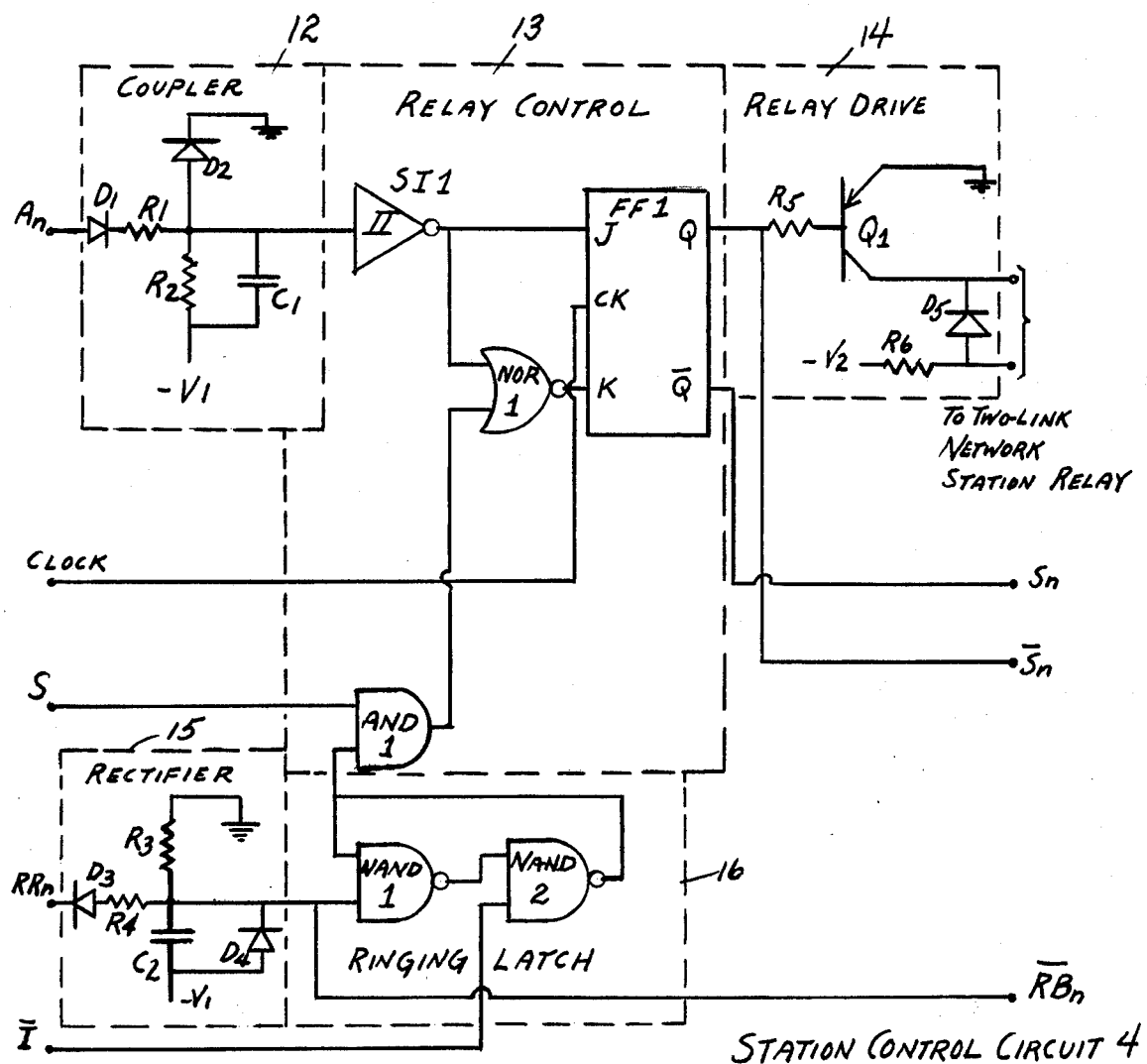
FIG. 4 is a detailed schematic diagram of a station control circuit employed in the adapter of FIG. 3.

FIG. 4 illustrates the working details of a Station Control Circuit 4. Each A-lead connects to the Relay Control 13 via a Coupler 12 consisting of diodes $D_1$, $D_2$, resistors $R_1$, $R_2$ and capacitor $C_1$. The A-lead connects to the anode of diode $D_1$, the cathode of which connects to resistor $R_1$. Resistor $R_1$ is in turn connected to the junction of resistor $R_2$ and capacitor $C_1$, the anode of diode $D_2$ and the Relay Control 13 input to Schmidt-trigger inverter $SI_1$. The cathode of $D_2$ is connected to ground, which prevents positive voltages from destroying $SI_1$. $R_2$ and $C_1$ provide a time constant which delays onhook recognition to the Relay Control 13, thereby guaranteeing reset of the intercom unit 2 and Dial Tone Control 9 during transfers (with T-function and $\overline{T}$ changing state as will be presently described) of the intercom unit 2 between links. Diode $D_1$ protects inverter $SI_1$ from large negative external voltages and resistor $R_1$ limits current flow into the logic circuit from external sources. Resistor $R_2$ also serves to hold the A-lead input in the low (onhook) state when the external source is open (not connected). The value of resistor $R_2$ must be larger than 10 times the value of resistor $R_1$ in order to insure that the external ground (offhook) A-lead signal clears the threshold of $SI_1$ under worst case operating conditions. Capacitor $C_1$ additionally serves to prevent external noise from inadvertently changing the state of the Relay Control 13.

The ringer ($RR_n$) output from the intercom unit 2, which also drives the telephone bell or buzzer, is connected to the Ringing Latch 16 and the Busy Tone Control 10 via the Rectifier 15, consisting of diodes $D_3$, $D_4$, resistors $R_3$, $R_4$ and capacitor $C_2$. The ringing signal, $RR_n$, connects to the cathode of $D_3$, the anode of which connects via resistor $R_4$ to the junction of resistor $R_3$, capacitor $C_2$ and the cathode of diode $D_4$ and thence to an input of NAND 1, and, as an output $\overline{RB}_n$, to the Busy Tone Control 10. Resistor $R_3$ is connected to ground, which keeps $\overline{RB}_n$ at a logic high (inactive) when there is no external ringing. Diode $D_3$ rectifies A.C. ringing voltage and serves to prevent positive voltages from destroying the logic circuits. Resistor $R_4$ limits current into the unit and diode $D_4$, the anode of which connects to $-V_1$, prevents negative voltages less than $-V_1$ from destroying the logic circuits. Capacitor $C_2$ prevents external noise from changing the state of the Ringing Latch 16 or disrupting the Busy Tone Control 10.

NAND 1 and NAND 2 are cross coupled to form the Ringing Latch 16. The latch is set (the output of NAND 2 goes low to $-V_1$) when ringing voltage on $RR_n$ causes the Rectifier 15 output to momentarily go low. The latch is held reset (output of NAND 2 high, at ground) whenever the $\overline{T}$ input to NAND 2 is active low, which happens whenever the Intercom Transfer Control 7 has transferred the intercom unit 2 to Link 1. The output of NAND 2, which indicates the station being rung by the intercom unit 2 when it is connected to Link 2, is connected to the Relay Control 13 at one input to AND 1.

The Relay Drive 14 consists of resistor $R_5$, PNP transistor $Q_1$, resistor $R_6$ and diode $D_5$. The base of PNP transistor $Q_1$ is driven by the Q output of flipflop FF1 in the Relay Control 13 via resistor $R_5$, which limits the base current of $Q_1$. The emitter of $Q_1$ connects to ground and the collector of $Q_1$ connects to one side of the coil of the relay $K_n$ in the Two Link Network 5 and to the cathode of diode $D_5$. The anode of $D_5$ and resistor $R_6$ are connected to the other side of the $K_n$ coil, and the other end of resistor $R_6$ connects to $-V_2$. Diode $D_5$ protects $Q_1$ and flipflop FF1 from flyback currents generated when the $K_n$ coil is deenergized, and resistor $R_6$ drops the $-V_2$ voltage to a value suitable for operating relay $K_n$. A logic low ($-V_1$) on the Q output terminal of flipflop FF1 causes $Q_1$ to turn on, operating $K_n$ and switching the nth station from Link 1 to Link 2.

The Relay Control 13 consists of Schmidt-trigger inverter $SI_1$, J-K flipflop FF1, NOR 1 and AND 1. The output of the Coupler 12 is connected to $SI_1$, which speeds up the slow voltage change of $R_2$-$C_1$ and creates a logic level which goes low when a station is offhook (A-lead at ground) and returns high a delay time (determined by $R_2$-$C_1$) after a station is onhook (A-lead open circuit). This output of $SI_1$ is connected directly to the J input of flipflop FF1 and indirectly via NOR 1 to the K input of FF1. When a station is onhook, the $SI_1$ output is high, which holds the output of NOR 1 low. Thus, J = 1 and K = 0, and FF1 is held set, with Q high, holding the Relay Drive 14 off and the relay $K_n$ deenergized. Therefore all onhook station's tip/ring 1 are connected to Link 1 of the Two Link Network 5. When a station goes offhook, $SI_1$ goes low (J, low) and the state of K is now determined by the other input to NOR 1, which is connected to the output of the AND 1 output. If AND 1 is high, K remains low and the station is not allowed to switch to Link 2; if the output of AND 1 is low (with $SI_1$ low), the K input to FF1 is high (J is low) and Q goes low (and $\overline{Q}$ high), turning on the Relay Drive 14, switching the station relay $K_n$ to Link 2. The Relay Control 13 outputs of FF1 (Q and $\overline{Q}$) are designated $\overline{S}_n$, $S_n$, respectively, Whenever $S_n$ is high ($\overline{S}_n$ low) it is an indication that the nth station has switched to Link 2.

Figure 5:
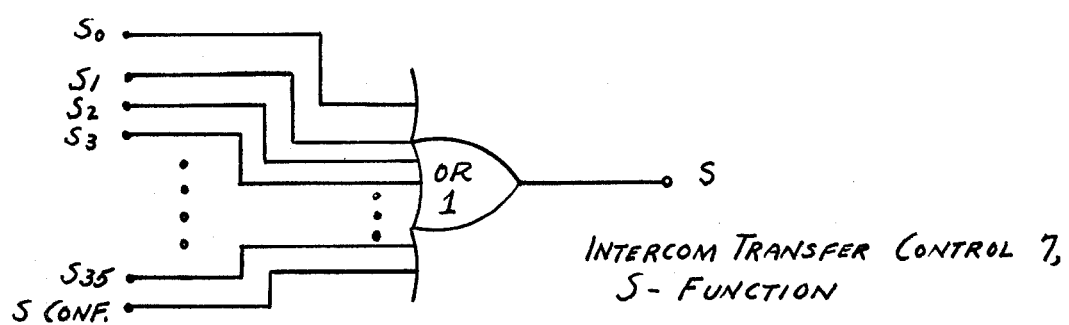
FIG. 5 is a wiring diagram illustrating the portion of the intercom transfer control circuit of FIG. 3 which forms the S-function.

Either of the two inputs to AND 1, S from the Intercom Transfer Control 7 or the Ringing Latch 16 output of NAND 2, must be low for a station to switch to Link 2. FIG. 5 illustrates the portion of the Intercom Transfer Control 7 which forms the S-function. The 37-input OR gate OR 1 has as inputs the 36 $S_n$ signals, one from each Station Control Circuit 4, and $S_{CONF}$, the active output of the Conference Control 11. Therefore, the only time the S-output, one of the inputs to all AND 1 gates, is low is when all stations are onhook and the conference feature is not active. This idle state is the first condition which enables a station to switch to Link 2.

Figure 7:
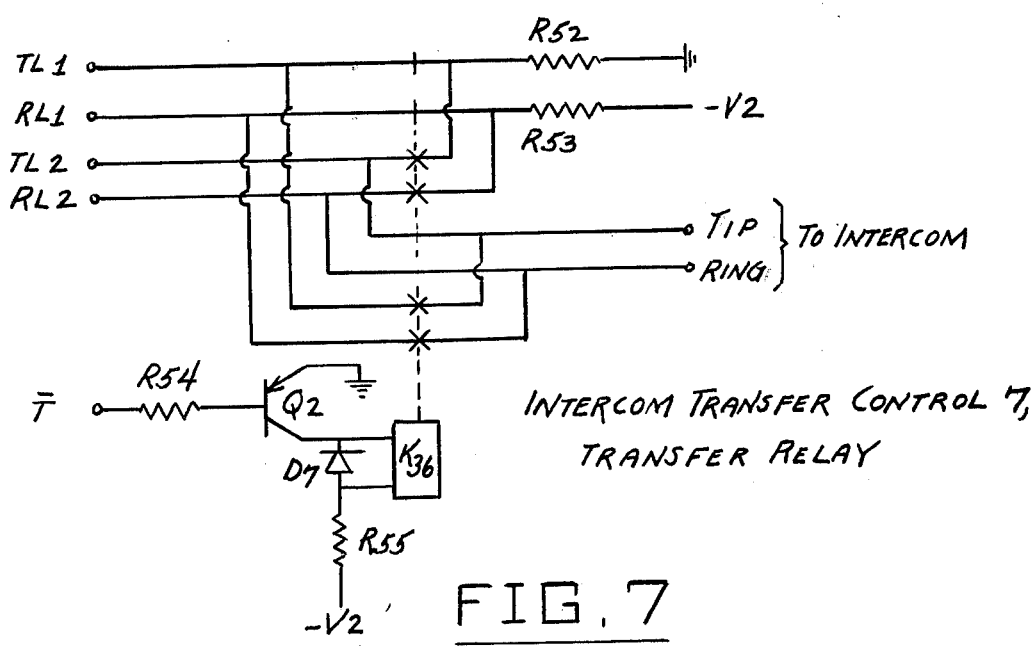
FIG. 7 is a wiring diagram illustrating the portion of the intercom transfer control circuit of FIG. 3 associated with the transfer relay of the control circuit.

When the first station offhook on an idle system switches to Link 2, its Station Control Circuit 4 switches $K_n$ to Link 2 and simultaneously forwards a high $S_n$ to the Intercom Transfer Control 7. OR 1 then returns a high S back to each AND 1. As long as all of the Ringing Latches 16 remain reset (NAND 2 output high), AND 1 is of high output and no other stations are allowed to switch to Link 2. Referring to FIG. 7, it is seen that in the idle state the intercom transfer relay $K_{36}$ connects intercom unit 2 to Link 2; as a result, this first offhook station is connected to the intercom unit 2 and is isolated from every other station by the action of the S-function and AND 1.

The second condition which allows a station to switch to Link 2 occurs when the first station on Link 2 dials into the intercom unit 2. The intercom unit 2 receives and decodes the dialed digits and switches ringing voltage to the called station's ringer ($RR_n$). This causes that station's Ringing Latch 16 to be set, the output of NAND 2 goes low, the output of AND 1 goes low, and this enables NOR 1 to forward a high to the K terminal of flipflop FF1 if the called station answers. Upon answering, this station also switches to Link 2 and has a direct, private connection to the calling station.

Now there exists two high $S_n$ signals; the S-function output remains high, but additionally the T-function portion of the Intercom Transfer Control 7 is activated. The T-function is an analog implementation of a theoretical logic circuit known as a "Dual Threshold Function." The Dual Threshold Function has a number of inputs designated $S_n$ (in this application there are 36 such inputs, $S_0$ through $S_{35}$), a rising threshold, $T_R$, and a falling threshold, $T_F$ (in this instance $T_R = 2$ and $T_F = 0$), and one output, T, governed by the following rules: 1) As long as no inputs are high, T remains low. 2) T goes high when the number of high inputs is equal to or exceeds $T_R$. 3) Once T has gone high, it will not switch low again until the number of high inputs is equal to or less than $T_F$. The two high $S_n$ signals created by the conversation established on Link 2 therefore cause activation of the T-function. T goes high, and its complement $\overline{T}$ goes low, forcing all Ringing Latches 16 to be held reset with the NAND 2 output high. This now locks off any other Station Control Circuit 4 from activating $K_n$ and switching to Link 2 until both of the two stations on Link 2 go onhook, reducing the number of high $S_n$ signals back to zero ($T_F$), resetting the T-function.

Figure 6:
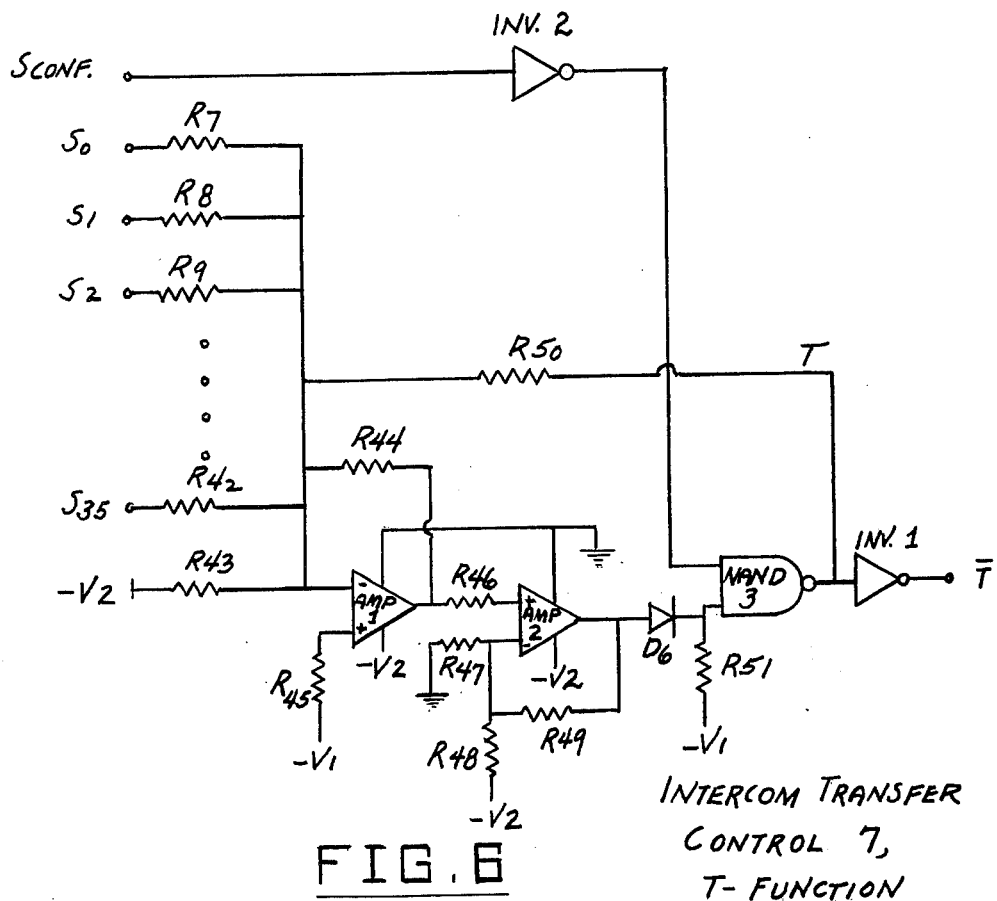
FIG. 6 is a wiring diagram illustrating the portion of the intercom transfer control circuit of FIG. 3 which forms the T-function.

The T-function generating circuit is illustrated in FIG. 6 and consists of resistors $R_7$ through $R_{51}$, diode $D_6$, operational amplifiers AMP 1 and AMP 2, NAND 3 and inverters INV 1, INV 2. The 36 $S_n$ signals from the Station Control Circuits 4 are connected via Resistors $R_7$ through $R_{42}$ to the inverting input of operational amplifier AMP 1, which also connects to $-V_2$ via resistor $R_{43}$, the AMP 1 output via resistor $R_{44}$, and the NAND 3 output (T) via resistor $R_{50}$. The non-inverting input to AMP 1 is connected to $-V_1$ via resistor $R_{45}$. As above mentioned, the power supplies are such that the value of $-V_2$ is twice that of $-V_1$. What this implies is that, for analog circuits connected between ground and $-V_2$, such as AMP 1 and AMP 2, $-V_1$ serves as a center or "signal ground" reference level.

With respect to $-V_1$ taken as zero, true ground appears as $+V_1$ and $-V_2$ appears as $-V_1$. By writing the gain formula for the AMP 1 circuit relative to $-V_1$ as signal ground and dividing by the first stage of the T-function, AMP 1 has an output in units of $V_1$ equal to $$\frac{-R_{44}}{(T/R_{50} + S_0/R_7 + S_1/R_8 + \ldots S_{35}/R_{42} - 1/R_{43})}.$$

In this formula the logic levels of T and $S_n$ are taken as numerical values 1 or 0, corresponding to high or low logic status. This is a result of using the low logic level as the "signal ground" for the AMP 1 circuit. Resistor $R_{43}$ is selected to be equal to resistor $R_{44}$, and the remaining resistors are selected to be three times that value, so that the AMP 1 output formula reduces to $$1 - S_0/3 - S_1/3 - \ldots S_{35}/3 - T/3.$$

As long as the output of NAND 3 (T) remains low, the AMP 1 output is $-(m/3)V_1$, with m being the number of high $S_n$ signals, which is equal to the number of stations connected to Link 2. The rising threshold requirement, $T_R = 2$, is met by monitoring the output of AMP 1 and amplifying the change from $-\frac{1}{3}V_1$ to $-\frac{2}{3}V_1$, so that it appears as a logic level change from ground to $-V_1$. It is to this purpose that AMP 2 is configured as a non-inverting, high gain single threshold comparator with a threshold of $-\frac{1}{2}V_1$.

The output of AMP 1 is connected to the non-inverting input of AMP 2 via resistor $R_{46}$. The inverting input to AMP 2 is connected to ground via resistor $R_{47}$, to $-V_2$ via resistor $R_{48}$, and to the AMP 2 output via resistor $R_{49}$. Selecting $R_{48}$ to be three times the value of $R_{47}$ sets the compare threshold of AMP 2 at $-V_1/2$; $R_{49}$ is selected such that the comparator gain is enough to guarantee that input threshold requirements of the physical device used for NAND 3 are met when the input to AMP 2 is at $-\frac{1}{3}V_1$ and $-\frac{2}{3}V_1$.

The output of AMP 2 is connected to the anode of diode $D_6$, the cathode of which connects to resistor $R_{51}$ and one input of NAND 3; the other end of resistor $R_{51}$ is connected to $-V_1$. Diode $D_6$ and resistor $R_{51}$ hold the input to NAND 3 at $-V_1$ whenever the output of AMP 2 is more negative than $-V_1$. The other input of NAND 3 connects to the output of INV 2 which has as its input the active high output of the Conference Control 11. A high level of $S_{CONF}$ will cause the INV 2 output to go low, forcing the output T of NAND 3 to be high, which causes the transfer relay $K_{36}$ (FIG. 7) to transfer the intercom unit 2 tip and ring to Link 1 and disable the Station Control Circuits 4. This permits a common talk path conference call to be set up on Link 1. When $S_{CONF}$ goes low, the forced T is removed, the S-function returns to low, and every offhook station is transferred to Link 2, causing the T and S functions to return high, transferring the intercom unit 2 back to Link 1, and excluding any other stations from the conference call now on Link 2. The details of the Conference Control 11 will be later described.

The output of NAND 3 connects to resistor $R_{50}$ and INV 1 and corresponds to the active high output T of the T-function. Once two $S_n$ signals have gone high and T goes high, the output of AMP 1 goes lower by $-\frac{1}{3}$ $V_1$, as though there were really three high $S_n$ signals. Now when only one of the stations on Link 2 goes on hook, the one remaining high $S_n$ signal plus the T output, via resistor $R_{50}$, keep the AMP 1 output at $-\frac{2}{3}V_1$ so that AMP 2 stays low and T remains active. When the last remaining station goes onhook, the T output momentarily holds the AMP 1 output at $-\frac{1}{3}V_1$, which causes the AMP 2 output to go high, causing T to go low, and allowing the AMP 1 output to return to ground. Resistor $R_{50}$ and the T/3 term in the formula for the AMP 1 output are responsible for the falling threshold ($T_F = 0$) of the T-function.

INV 1 is the active low ($\overline{T}$) output producer for the T-function. As was previously discussed, the $\overline{T}$ output connects to the Station Control Circuits 4 and disables the Relay Control 13 via the forced reset of the Ringing Latch 16, preventing offhook stations other than the two which activated the T-function (or more than two if a conference was set up) from being switched to Link 2. $\overline{T}$ additionally is furnished to the input of the actuating circuit of the transfer relay $K_{36}$, illustrated in FIG. 7.

The transfer relay circuit of FIG. 7 consists of the four-form-C contact relay $K_{36}$, resistors $R_{52}$ through $R_{55}$, diode $D_7$ and PNP transistor $Q_2$. $\overline{T}$ is supplied to the base of PNP transistor $Q_2$ via resistor $R_{54}$; the emitter of $Q_2$ is connected to ground and the collector thereof is connected to the cathode of diode $D_7$ and one side of the coil of relay $K_{36}$. The anode of $D_7$ and the other side of the relay coil are connected to $-V_2$ via resistor $R_{55}$, which drops the voltage $-V_2$ to the operating voltage of relay $K_{36}$. It can be seen that a low logic level from $\overline{T}$ will turn on $Q_2$ and activate relay $K_{36}$; a high on $\overline{T}$ deactivates relay $K_{36}$. The contacts of relay $K_{36}$ are connected as follows: the tip and ring of Link 1 (TL$_1$,RL$_1$) of the Two Link Network 5 are connected to resistors $R_{52}$ and $R_{53}$ via two of the normally closed contacts of relay $K_{36}$ and to the tip and ring of the intercom unit 2 via two of the normally open contacts of relay $K_{36}$; the tip and ring of Link 2 (TL$_2$,RL$_2$) of the Two Link Network 5 are connected to resistors $R_{52}$ and $R_{53}$ via the other two normally open contacts of relay $K_{36}$ and to the tip and ring of the intercom unit 2 via the remaining two normally closed contacts. Resistor $R_{52}$ connects to ground and resistor $R_{53}$ connects to $-V_2$, which serve as the battery power for the second talk path; the intercom unit 2 itself powers the other talk path. As long as the T-function is inactive, the intercom unit 2 is connected to Link 2 and the resistive battery source powers Link 1. Once a call has been established and the T-function is active, relay $K_{36}$ is activated and the intercom unit 2 is transferred and connected to Link 1 and the resistive battery source is switched over to Link 2.

At this point it is important to summarize the interworkings of the Two Link Network 5, the Station Control Circuits 4 and the Intercom Transfer Control 7 with respect to the intercom telephone station users, since these characteristic operations are inherent to any embodiment of the invention, whether that embodiment is physically similar to the specific embodiment disclosed herein or not. All stations must be at all times connected to one link or the other. The first call on an idle system is isolated from any other stations which go offhook prior to the first call being connected. Once the first call is connected to one of the links, it remains isolated and is powered by a separate talk battery, and all remaining stations are held buss-connected to the intercom unit 2 on the other link as though there were no Two Link Intercom Adapter 3 installed. If both links are busy and the isolated link parties terminate their call, the call on the other link is immediately isolated by an appropriate transfer. As a result of these operational characteristics, the two links appear different to the telephone user. The primary link, which is Link 2 in this embodiment, over which the first call is placed and connected, has the property of exclusivity or privacy in that no portion of the intercom call can be interrupted or monitored by another party. Once a first call has been connected, the secondary link is available for another call, but, since all remaining stations are buss-connected via it to the intercom unit 2, it has the properties of a party line, or nonexclusivity, in that any station may go offhook and interrupt or monitor the intercom call. The nature of the present invention is to prefer assignment to the private link, that is, whenever an existing private link conversation terminates, any stations offhook on the non-exclusive link are immediately transferred to the private link. If only one station is transferred, then the intercom unit 2 is also transferred to the private link. If two or more stations are transferred to privacy, the call is assumed to be connected and the intercom unit 2 remains attached to the non-exclusive link.

One feature of tone dialing intercom units 2 is lost when the Two Link Intercom Adapter 3 is used to replace the single-bussed tip/ring 1 connection; that is the ability to call more than one station and establish a three or more party conference call. This may be done on the non-exclusive link only and there exists the possibility that the first two parties will be transferred to privacy before a third party can be called. The present invention provides for this feature to be optionally restored by including a Conference Control 11, which may be used or not, depending upon the desires of the users of the system. The Conference Control 11 can operate in a number of different ways, but its prime function is to allow the intercom users to selectively defeat the circuitry which assigns the first call to the private link until more than two parties have been connected.

Within the constraints of the circuitry of this particular embodiment of the invention there exists two methods by which this conferencing may be accomplished. In the first method, the T-function output is forced low under control of the calling party by his dialing of a number assigned to control conferencing. This would allow the Ringing Latches 16 to detect third and subsequently called parties and allow their tip-ring pairs to be switched to Link 2 by the Station Control Circuits 4 as the called conferencing stations answer. Any station in the conference now dials the control number again, which then releases the T-function to normal and the intercom unit 2 is transferred to Link 1, leaving the conference callers in privacy, connected to Link 2.

The second method consists of forcing the S and T-functions' outputs high when the calling party first dials the conference number. This causes an immediate transfer which holds the intercom unit 2 connected to Link 1 and disables all of the Station Control Circuits 4. The caller then hangs up, to reset his own Station Control Circuit 4, and goes offhook on Link 1 and calls the numbers of the other conferencing parties. When each has answered, any station in the conference again dials the conference number, which then releases the S and T-functions to normal operation and all conferring stations are transferred to Link 2 and the intercom unit 2 is left behind on Link 1 to service the non-exclusive link calls.

Figure 8:
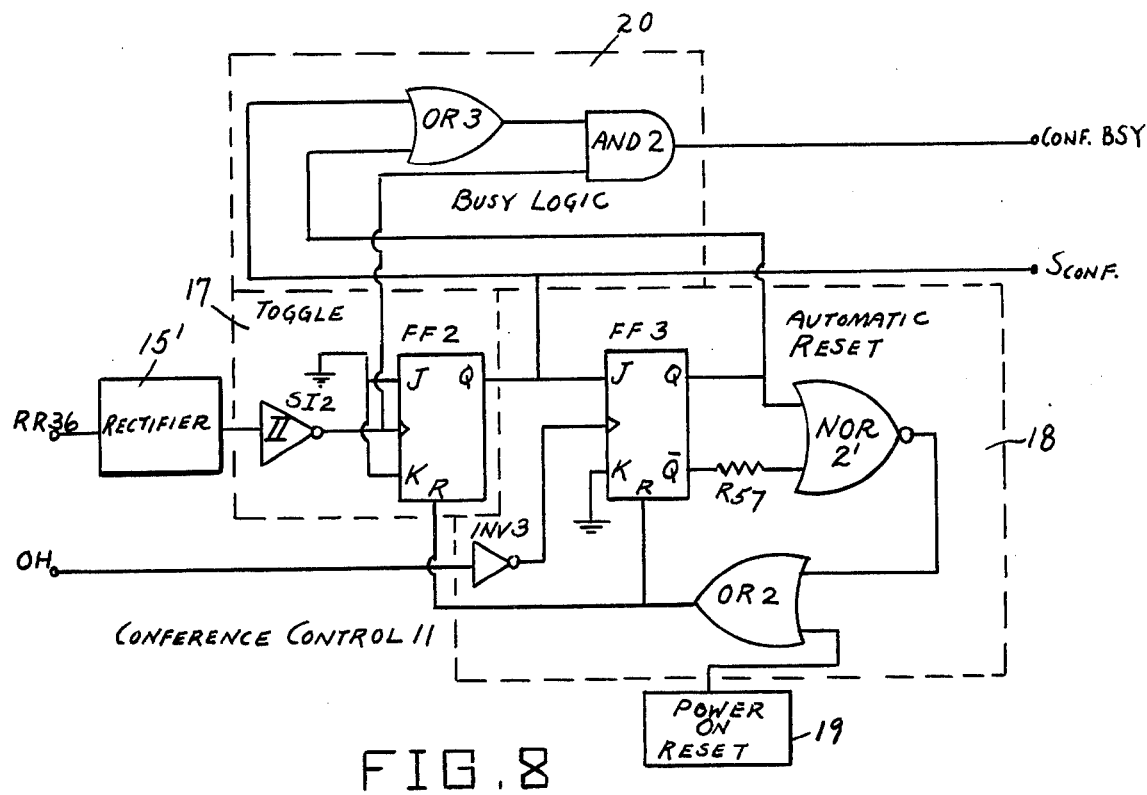
FIG. 8 is a wiring diagram illustrating the details of the conference control circuit of FIG. 3.

Although either method described above is within the scope of the present invention, the circuitry of the particular embodiment disclosed herein utilizes the second method. From the above description of the Intercom Transfer Control 7 it will be seen that the signal $S_{CONF}$ is gated into the S-function, FIG. 5, and the T-function, FIG. 6, such that a high level of $S_{CONF}$ forces both S and T high, whereas a low of $S_{CONF}$ allows the normal operation whereby only two parties can converse via the private link, Link 2. The purpose of the Conference Control 11, illustrated in FIG. 8, is to allow the telephone user to alternate the state of $S_{CONF}$ by way of an extra ringing signal $RR_{36}$ from the intercom unit 2, corresponding to the number assigned to control conferencing. The Conference Control 11 consists of a Rectifier 15', Toggle 17, Automatic Reset 18, Power On Reset 19 and Busy Logic 20. $RR_{36}$ is connected to the input of the Rectifier 15', which is identical to the Rectifier 15 utilized in the Station Control Circuits 4 illustrated in FIG. 4. The active low output of the Rectifier 15' connects to the Toggle 17, consisting of Schmidt-trigger inverter $SI_2$ and J-K flip-flop FF2.

Inverter $SI_2$ squares up and inverts the output of Rectifier 15', creating an active high signal with a fast transition suitable for clocking an edge-triggered flip-flop. The output of $SI_2$ connects to the clock input of FF2 and to the Busy Logic 20. FF2 thus receives a clocking transition, derived from the $RR_{36}$ ringing signal, whenever the conference control number is dialed. The J and K inputs to FF2 are both connected to ground, the high logic level, which causes FF2 to toggle, or complement, its outputs every time a clocking edge occurs. The Q output of FF2 is designated $S_{CONF}$, which is the alternating logic signal connecting to the S- and T-functions, as previously disclosed, to allow the user to temporarily defeat the normal operation of the Intercom Transfer Control 7 and force a transfer to Link 1, allowing a conference call to be set up.

$S_{CONF}$ additionally connects to the Busy Logic 20 and the Automatic Reset 18; the output of the latter connects to the asynchronous reset input, designated R, to FF2. The Automatic Reset 18 consists of inverter INV 3, FF3, NOR 2', OR 2 and resistor $R_{57}$. Signal OH, which is an output of the Dial Tone Control 9, is an active high logic signal corresponding to offhook seizure of the intercom unit 2. Signal OH connects to the input of INV 3, the output of which connects to the clock input of FF3, which is therefore clocked every time the intercom unit 2 is released, whether by a transfer to Link 1 or a calling party onhook. The K input to FF3 is connected to ground and the J input connects to $S_{CONF}$. When the Conference Control 11 is reset and $S_{CONF}$ is low, FF3 will also be reset, with its Q output low and $\overline{Q}$ high, and will be held reset by the onhook transitions clocking FF3. When $S_{CONF}$ is toggled high during the first step in setting up a conference, J and K both become high, placing FF3 in a toggle mode. At the same time the intercome unit 2 is forced to transfer to Link 1, causing OH to go low, and causing FF3 to be clocked so that its Q output toggles high. This Q output connects to one input of NOR 2' and also connects to the Busy Logic 20; the $\overline{Q}$ output of FF3 connects to the other input of NOR 2' via delay resistor $R_{57}$. In this embodiment the logic input impedances are primarily capacitive, allowing a resistor to be used as a delay element; if the physical embodiment of the logic circuits were input resistive or current sourcing, a capacitor connected to $-V_1$ would be used in place of $R_{57}$ to achieve a delay.

At this point in the procedure, after the forced transfer has taken place, the FF3 Q output is high, the $\overline{Q}$ output and $R_{57}$ output are low, and the output of NOR 2' is low. Now suppose the caller abandons the conference set-up procedure; the next call to be placed is on Link 1, since Link 2 access has been locked out by $S_{CONF}$. When this next call terminates on Link 1 and the intercom unit 2 is released, FF3 receives another clock signal, causing Q to go low and $\overline{Q}$ to go high. Because of the delay introduced by $R_{57}$, however, the $R_{57}$ input to NOR 2' will remain low for a delay time before going high, while the Q input to NOR 2' goes low immediately. This causes a short pulse, the duration of which is equal to the $R_{57}$ delay, to be the output from NOR 2'. The NOR 2' output is connected to one input of OR 2, which has its output connected to the Toggle 17 asynchronous reset, R of FF2, and to R of FF3. The pulse originating from NOR 2' thus resets $S_{CONF}$ to a low state, thereby releasing the S- and T-functions to normal. The other input to OR 2 is connected to a Power On Reset 19 circuit which generates a short, high-going pulse when power is first applied to the system so that the private link is not locked out when the first call is made, and FF3 is not armed to give an erroneous reset to FF2 if the first call after energization is a conference call.

The Busy Logic 20 consists of OR 3 and AND 2. The Q outputs of FF2 and FF3 connect to the two inputs of OR 3, the output of which is connected to one input of AND 2. The other input of AND 2 is connected to the output of $SI_2$, which is an active high logic level corresponding to the ringing signal for the conference control number. The output of AND 2, designated CONF BSY, becomes active high if the conference number is dialed whenever FF2 or FF3 has been previously set. CONF BSY connects to the Busy Tone Control 10, which will cause the caller to receive a busy tone indication, if CONF BSY goes high, as an indication that the Conference Control 11 is temporarily not available for use, since both FF2 and FF3 must be reset to begin the forced transfer procedure.

Figure 9:
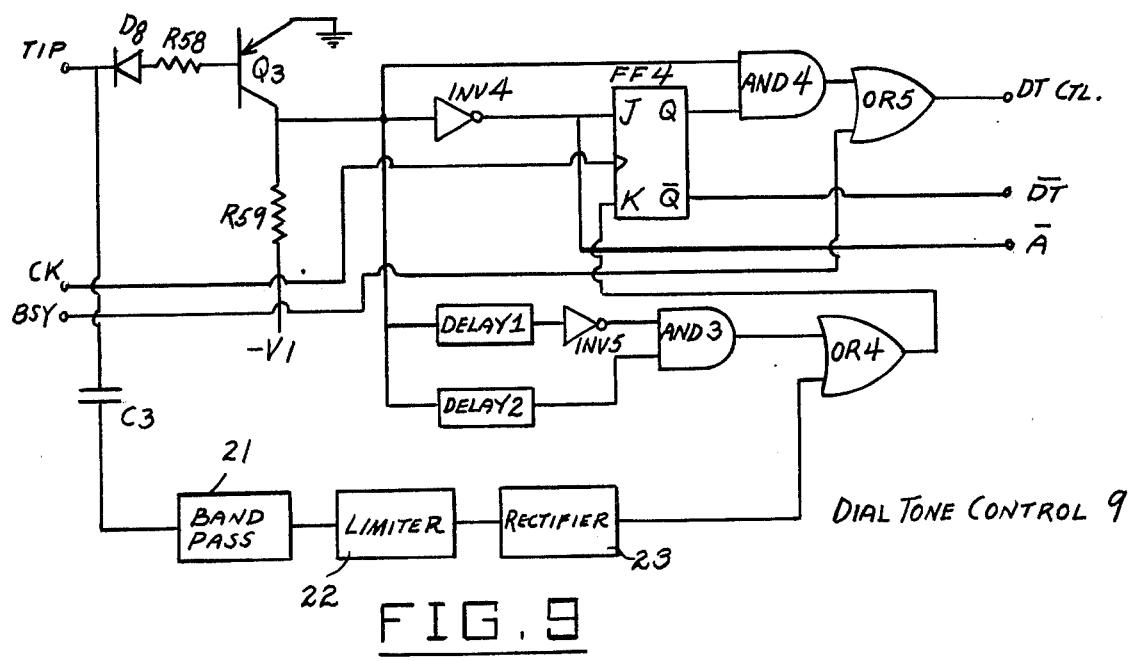
FIG. 9 is a wiring diagram illustrating the details of the dial tone control circuit of FIG. 3.

The purpose of the Dial Tone Control 9 is to provide a gating signal, designated DT CTL, to turn on the Dial Tone Source 8 each time a new offhook occurs on the intercom unit 2 and to turn off the Dial Tone Source 8 when the first rotary and/or tone digit is dialed, and to additionally provide onhook status information to the Busy Tone Control 10 and Conference Control 11. Any circuit which detects onhooks, offhooks, tone and/or rotary dialing, and using this information, controls application of dial tone subject to the constraints of the operational characteristics of the Two Link Network 5, Station Control Circuits 4, and Intercom Transfer Control 7 operating an conjunction with each other as is herein disclosed, is acceptable as a Dial Tone Control 9 and is within the scope of the present invention. One particular embodiment is illustrated in FIG. 9, and consists of diode $D_8$, resistor $R_{58}$, resistor $R_{59}$, capacitor $C_3$, transistor $Q_3$, inverter INV 4, inverter INV 5, flip-flop FF4, gates AND 3, AND 4, OR 4 and OR 5, delay elements DELAY 1, DELAY 2, Band Pass 21, Limiter 22 and Rectifier 23.

The tip of the intercom unit 2 connects to the cathode of diode $D_8$ and to capacitor $C_3$. The anode of $D_8$ is connected to resistor $R_{58}$, the other end of which connects to the base of the PNP transistor $Q_3$. The emitter of $Q_3$ connects to ground and the collector connects to resistor $R_{59}$, the other end of which connects to $-V_1$. The collector of $Q_3$, at its connection to $R_{59}$, also connects to one input of AND 4, the input of INV 4, and to the inputs of the two delay elements DELAY 1 and DELAY 2. Transistor $Q_3$ turns on whenever the DC voltage level on the tip of the intercom unit 2 goes below a negative value determined by the forward voltage drop of $D_8$, the value of $R_{58}$, and the gain characteristics of $Q_3$. The component values are selected such that this turn-on voltage level is well below ground but more positive than the voltage level which occurs on the tip of the intercom unit 2 when a telephone loop is established on tip and ring by an offhook caller via Link 1 or Link 2.

Alternatively, $Q_3$ is cut off whenever the intercom unit 2 is not seized, also during rotary dial pulses, and for a short time if the intercom unit 2 is transferred between links with offhook stations on both links. The latter condition occurs if a station on Link 1 is offhook waiting to use the system when a call being placed on Link 2 is answered. When $Q_3$ is off, $R_{59}$ pulls the collector to $-V_1$; when $Q_3$ is on, the collector voltage goes essentially to ground. Thus the collector of $Q_3$ serves as a logic level indicator of intercom unit 2 seizure status; a low level represents onhook, a high level represents an offhook, a long pulse going low represents a dial pulse, and a short pulse indicates a transfer.

The output of INV 4, designated $\overline{A}$, is the logical inverse of the $Q_3$-generated seizure status and is connected to the J input of FF4, the clock of which is connected to and is continuously pulsed by the system Clock 6. $\overline{A}$ is also connected to the Busy Tone Control 10 for onhook resetting purposes. Assuming for the moment that the K input to FF4 is at zero, FF4 will have its J input high whenever the intercom unit 2 is not seized, since $Q_3$ will be off, its collector will be held at $-V_1$ by $R_{59}$, and the INV 4 output, which connects to J of FF4, will be high. Since FF4 is clocked continuously, its Q output, which is connected to the other input of AND 4, will be preset in the high state when neither link is busy or when Link 2 serves as a talk connection and Link 1 is idle. When the intercom unit 2 is seized, the J input to FF4 goes to zero and, assuming K is still at zero, the FF4 Q output remains high and the other input to AND 4 goes high, causing the AND 4 output to go high. The AND 4 output connects to one input of OR 5, the other input of which connects to the Busy Tone Control 10 gating output, designated BSY. The OR 5 output, designated DT CTL, connects to and enables, when high, the Dial Tone Source 9. The operation of INV 4, the J input to FF4, and AND 4 can be summarily described as an onhook to offhook transition detector which enables dial tone whenever the intercom unit 2 seizure state changes from onhook to offhook. Once offhook, a high level of the K input will reset the Q output low, causing the AND 4 output to go low, which causes the OR 5 output, DT CTL, to go low and turn off the Dial Tone Source 9 until a BSY gating signal should occur or another onhook to offhook transition occurs. The $\overline{Q}$ output of FF4, designated $\overline{DT}$, goes high when FF4 is reset and is connected to the Busy Tone Control 10 as an indication that dial tone has been turned off.

The K input to FF4 is connected to the output of OR 4, the two inputs of which connect to the outputs of AND 3 and a Rectifier 23. The output of DELAY 1 connects to INV 5, the output of which connects to one input of AND 3; the output of DELAY 2 connects to the other input of AND 3. The time duration of DELAY 1 is chosen to be longer than the short onhook pulse caused by a transfer and at the same time shorter than the shortest possible dial pulse as defined by communications industry practice. The time duration of DELAY 2 is chosen to be longer than the longest possible dial pulse yet shorter than the shortest time allowable to be defined as an onhook for the purposes of system reset. Both delays are constructed one-sided such that only low going logic levels are delayed for the full delay time; high levels pass through with only slight delay, set to be longer than the delay from TIP through $Q_3$ and INV 4 to J of FF4. The short onhook pulse occurring during a transfer will not affect either delay element; the output of DELAY 1 stays high, the output of INV 5 stays low, and therefore the output of AND 3 is low and K of FF4 is not affected. Therefore, the transfer pulse transition will turn dial tone on through the actions of INV 4, the J input to FF4, and AND 4, as described above.

Dial pulses will hold $Q_3$ off long enough so that the DELAY 1 output goes low while that of DELAY 2 remains high. The output of INV 5 goes high and the output of OR 4 goes high. As the pulse ends, the slight high-going delay in DELAY 1 holds the K input to FF4 high after the J input goes low again, and thus, FF4 is reset and the dial pulse shuts off dial tone. If the time duration of the onhook is longer than a dial pulse such that the output of DELAY 2 also goes low, the other input to AND 3 goes low, causing the OR 5 output to return low, thereby allowing the high level on the J input to FF4 to dominate and preset FF4 until the next offhook again enables dial tone. The combined actions of DELAY 1, DELAY 2, INV 5 and AND 3 can be summarily described as a dial pulse discriminator, and is responsible for shutting off dial tone when rotary dial telephones are used within the application of the present invention. Applications not using rotary dial telephones could have these components eliminated from the Dial Tone Control 9 and still be within the scope of the present invention.

The Rectifier 23, the output of which connects to the other input of OR 4, has as its input the output of a Limiter 22, which has as its input the output of a Band Pass 21 frequency-dependent amplifier. The input to the Band Pass 21 is capacitively coupled to the TIP of the intercom unit 2 via $C_3$. AC signals present on the intercom unit 2 TIP are filtered by the Band Pass 21 to exclude all frequencies not in the range of the dual tone multi-frequency (DTMF) digit spectrum, as defined by the telephone communications industry. Since specific digit values are not required by the Dial Tone Control 9, the frequency envelope of the Band Pass 21 is chosen only to detect the high frequency group, 1209–1633 Hz, or the low frequency group, 697–941 Hz, or both, in order to have an indication of the presence of DTMF, not the actual tone pair values. In one particular embodiment the Band Pass 21 is configured to detect any frequency within the range of the high group only; a more accurate scheme employing multiple Band Pass 21 amplifiers tuned exactly to the frequencies of interest, with their associated Rectifiers 23 outputs furnished to OR gates, would still be within the scope of the present invention. The output of the Band Pass 21 is amplified by the Limiter 22, which is selected to have a high enough gain such that the AC sinusoidal output of the Band Pass 21 becomes a square wave at the Limiter 22 output. The AC circuitry implementing the Band Pass 21 and Limiter 22 is configured about $-V_1$ as a signal reference ground such that the square wave output of the Limiter 22 is centered about $-V_1$ and swings nearly to ground in the positive cycle and to $-V_2$ in the negative cycle, and remains at $-V_1$ if no AC signals in the Band Pass 21 spectrum are present on TIP. The Rectifier 23 is configured to invert the half cycle that goes to $-V_2$ such that the signal output to OR 4 goes high to ground for the duration of any AC signal passed by the Band Pass 21 and Limiter 22.

The high output of the Rectifier 23 causes OR 4 output to go high, causing the K input signal to FF4 to be high, resetting FF4 and shutting off dial tone until the next onhook to offhook transition occurs. Applications of the present invention not using DTMF telephones could omit $C_3$, Band Pass 21, Limiter 22, and Rectifier 23 from the Dial Tone Control 9 and still be within the scope of the present invention. The specific circuitry of the Band Pass 21, Limiter 22 and Rectifier 23 is not disclosed in FIG. 9 since these are common circuits well known to those skilled in the art and could be readily obtained in practicing the present invention, given the Dial Tone Control 9 operation as herein disclosed. Forms of telephone number dialing other than using rotary dial pulses or DTMF, with circuits which detect the presence or absence of the dialing, may be connected to cause K of FF4 to go high in the presence of dialing to reset dial tone, such resulting circuitry constituting a valid Dial Tone Control 9 within the spirit of the present invention.

Figure 10:
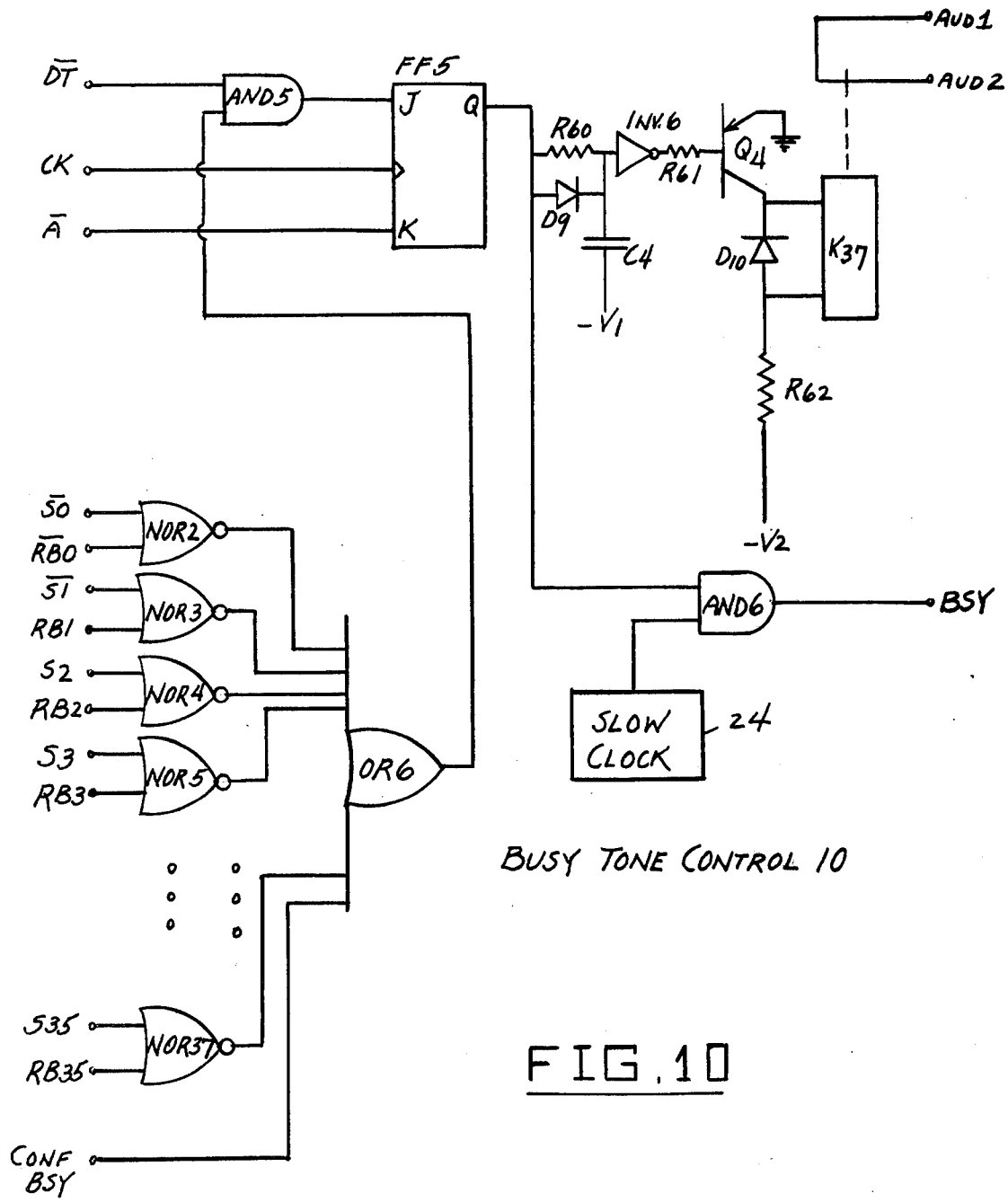
FIG. 10 is a wiring diagram illustrating the details of the busy tone control circuit of FIG. 3.

One consequence of having two talk paths in the Two Link Intercom Adapter 3 is the possibility that a caller on Link 1 could dial the number of a station already conversing via Link 2. It would be within the scope of the present invention to allow dial tone to cease and the called station to ring, but such operation is normally not considered good telephone communications practice. The more accepted procedure is to forward some form of busy tone indication to the calling party after dial tone has ceased, and to additionally prevent the called station from ringing, so as not to disturb an in-progress call. For such purposes the preferred embodiment of the present invention includes a Busy Tone Control 10, illustrated in FIG. 10, consisting of gate AND 5, flip-flop FF5, resistor $R_{60}$, diode $D_9$, capacitor $C_4$, inverter INV 6, resistor $R_{61}$, transistor $Q_4$, diode $D_{10}$, relay $K_{37}$, resistor $R_{62}$, gates AND 6, OR 6 and NOR 2 through NOR 37, and a Slow Clock 24. The thirty-six $\overline{S_n}$ and $\overline{RB_n}$ signals paired from each of the 36 Station Control Circuits 4 are connected to the inputs of 36 two-input NOR gates designated NOR 2 through NOR 37. The two inputs to NOR 2 are connected to $\overline{S0}$ and $\overline{RB0}$; the two inputs to NOR 3 are connected to $\overline{S1}$ and $\overline{RB1}$; and the connections continue in this fashion, ending with $\overline{S35}$ and $\overline{RB35}$ being connected to the two inputs of NOR 37. Each of these NOR gates provides a high logic output only when the corresponding Station Control Circuit 4 outputs $\overline{S_n}$ and $\overline{RB_n}$ are both low, indicating that station is switched to Link 2 and is being rung, respectively. Each of these 36 NOR gate outputs, being active high busy indications for each station, is connected individually to 36 inputs of OR 6, the 37th input of which is connected to receive the busy indication from the Conference Control 11, CONF BSY. The output of OR 6 is connected to one input of AND 5, the other input of which is connected to $\overline{DT}$, the active high indication from the Dial Tone Control 9 that dial tone has ceased. The output of AND 5 goes high once dial tone has ceased and a busy indication condition is sensed. This output is connected to the J input of FF5, which has its clock terminal connected to the system Clock 6 and its K input connected to $\overline{A}$, the output from the Dial Tone Control 9 which goes high when the intercom unit 2 TIP and RING are open circuited, corresponding to onhooks, transfers and dial pulses. Thus, the Q output of FF5 is set high when the intercom unit 2 is seized, or offhook, and dial tone has ceased, or dialing has taken place, and the resultant ringing has caused a busy indication; and the Q output of FF5 is reset by onhooks, dial pulses, and transfers.

The Q output of FF5 is connected to resistor $R_{60}$, the anode of diode $D_9$, and to one input of AND 6, the other input of which connects to a Slow Clock 24, the rate and duty cycle of which are chosen by applicable telephone practice as a recognizable busy tone interruption. The output of AND 6, designated BSY, is connected to the Dial Tone Control 9 through which the Dial Tone Source 8 is gated on and off synchronously with the Slow Clock 24 by the BSY signal whenever the busy condition is to be indicated. The cathode of $D_9$, connected to the other end of $R_{60}$ and one end of $C_4$, the other end of which connects to $-V_1$, is connected to the input of inverter INV 6. $R_{60}$, $D_9$ and $C_4$ collectively form a delay element, the output of which goes high simultaneously with the Q terminal of FF5 and stays high for a time delay, determined by the values of $R_{60}$ and $C_4$, after Q of FF5 is reset low by an onhook or transfer. The output of INV 6, being the inversion of the delay element signal, is connected to the base of transistor $Q_4$ via resistor $R_{61}$. $Q_4$ has its emitter connected to ground and its collector connected to the cathode of diode $D_{10}$ and one side of the coil of single, normallyclosed contact relay $K_{37}$. The anode of $D_{10}$ and the other side of the coil of $K_{37}$ connect to $-V_2$ via resistor $R_{62}$, which, along with the coil resistance, divides $-V_2$ to a voltage suitable for operating relay $K_{37}$ when $Q_4$ turns on.

When FF5 has been set by a caller on Link 1 ringing a station already switched to Link 2, the low output of INV 6 turn on $Q_4$, activating relay $K_{37}$. The $K_{37}$ normally closed contacts, the terminations of which are designated AUD 1 and AUD 2, are inserted in series with the audible ringing power supply connection to the intercom unit 2, designated AUD SUP, as illustrated in FIG. 2. Thus, the power to the ringer in the called station is cut off the instant that it is detected, and held off for a delay time determined by $R_{60}$ and $C_4$ after the caller hangs up, resetting FF5. The $R_{60},C_4$ values are chosen such that this delay time masks any ringing which may continue after FF5 is reset if the intercom unit 2 is released immediately.

While a specific embodiment of an improved two-link intercom system has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An intercom system comprising dial-responsive station-selecting means provided with means to transmit ringing signals to called stations, and a plurality of stations which can go offhook and onhook and which are provided with dialing means for calling stations in the system, first link circuit means normally connected to all said stations, second link circuit means normally connected to said selecting means and defining an exclusive talk path, link-selecting means to connect a calling station and a called station via said second link circuit means responsive to the establishment of a first call by the calling station to the called station when the system is idle, leaving the first link circuit means available on a non-exclusive basis for subsequent calls between the other stations of the system, wherein said link-selecting means comprises respective relay means connected to the stations, means to switch the stations from said first link circuit means to said second link circuit means responsive to activation of said respective relay means, respective station relay activating means comprising a J-K flipflop having J and K inputs and Q and $\overline{Q}$ outputs, means establishing a first state of the flipflop wherein J = 1 and K = 0 and Q is high and $\overline{Q}$ is low, means normally holding the associated station relay means deenergized in said first state of the flipflop, whereby all onhook stations are connected to the first link means, means changing the flipflop of a calling station to a second state wherein J = 0 and K = 1 and Q is low and $\overline{Q}$ is high when said calling station goes offhook with the system idle, and means to activate the calling station relay means responsive to the changing of its associated flipflop to said second state, whereby the calling station is switched to said second link circuit means, and means switching a called station to said second link circuit means when it goes offhook after receiving a ringing signal.

2. The intercom system of claim 1, and means to automatically switch a subsequent call in progress on said first link circuit means to said exclusive second link circuit means responsive to the termination of the first call, whereby to render said subsequent call private.

3. The intercom system of claim 1, and means to establish a conference call between three or more stations on an exclusive basis in the second link circuit means.

4. The intercom system of claim 1, and means to establish a conference call between three or more stations on the first link circuit means, and means to automatically switch the conference call to said second link circuit means when said second link circuit means becomes idle.

5. The intercom system of claim 1, and wherein said stationselecting means is provided with a first current source which normally energizes said second link circuit means, and wherein said first link circuit means is provided with a second current source.

6. The intercom system of claim 1, and means to impose a time delay in deactivation of said last-named relay means when said calling station subsequently goes onhook.

7. The intercom system of claim 1, and wherein said last-named switching means includes means to enable activation of the relay means of a called station responsive to a ringing signal from said station-selecting means.

8. The intercom system of claim 1, and means connecting the calling station to said station-selecting means responsive to activation of its relay means.

9. The intercom system of claim 1, and means connecting the calling station to said station-selecting means responsive to activation of its relay means to enable the station-selecting means to transmit a ringing signal to a called station.

10. The intercom system of claim 1, and means connecting the calling station to said station-selecting means responsive to activation of its relay means to enable the station-selecting means to transmit a ringing signal to a called station, and means to activate the relay means of said called station responsive to said ringing signal.

11. The intercom system of claim 10, and means switching the station-selecting means to said first link circuit means when said called station goes offhook.

12. The intercom system of claim 1, and circuit means normally connecting said second link circuit means to said station-selecting means and including transfer control relay means, means to switch said station-selecting means to said first link circuit means responsive to activation of said transfer control relay means, and means to activate said transfer control relay means responsive to the establishment of a call, namely, when a called station goes offhook.

13. The intercom system of claim 12, and wherein said means to activate said transfer control relay means comprises ringing signal-responsive means at the called station, gate means connecting said ringing signal-responsive means to the K input of the J-K flipflop at the called station, and means to generate a K = 1 state at the output of said gate means responsive to an ensuing offhook state at said called station, whereby to enable the called station to be switched by its transfer relay means to said second link circuit means when the called station answers.

14. The intercom system of claim 12, and a dial tone source, circuit means normally connecting said dial tone source to said second link circuit means, and circuit means switching said dial tone source to said first link circuit means responsive to the activation of said transfer control relay means.

15. The intercom system of claim 12, and means to activate said transfer control relay means to transfer the station-selecting means to said first link circuit means responsive to the dialing of a conference call number by an offhook calling station on said second link circuit means.

16. The intercom system of claim 1, and means to switch said station-selecting means to said first link circuit means responsive to the dialing of a conference call number by an offhook calling station on said second link circuit means, and means to thereafter call a plurality of additional stations on said first link circuit means without going onhook between the successive dialings of the additional stations, whereby to establish a conference with the additional stations offhook.

17. The intercom system of claim 16, and means switching the conferenced stations to said second link circuit means responsive to a second dialing of said conference call number by one of the offhook stations.

18. The intercom system of claim 16, and means providing a busy signal when a station on said first link circuit means dials the conference call number with either a two-party call in progress or a private conference in progress on said second link circuit means.

19. The intercom system of claim 1, and a dial tone source, circuit means normally connecting said dial tone source to said second link circuit means, and tone source control means connected to said dial tone source and providing a gating signal to turn on said dial tone source when calling station offhook occurs and to turn off said dial tone source responsive to dialing by the calling station.

20. The intercom system of claim 19, and wherein said tone source control means includes dialing-responsive signal frequency bandpass means passing a predetermined range of frequencies which can be employed in Touch Tone dialing.

21. The intercom system of claim 19, and means to key said tone source control means periodically at a relatively slow rate to provide a keyed gating signal to said tone source, forming a busy signal, when a calling station on the first link circuit means dials the number of a station already connected to the second link circuit means.

22. The intercom system of claim 21, and means to inhibit said called already connected station from ringing, so as not to disturb an in-progress call.

23. The intercom system of claim 22, and wherein said inhibiting means comprises relay means controlling the ringing source and disconnecting said ringing source from the called station when activated, and means to activate said last-named relay means responsive to the already connected state of the called station in said second link circuit means or the presence of said busy signal.

* * * * *